United States Patent
Yan et al.

(10) Patent No.: US 10,671,029 B2
(45) Date of Patent: Jun. 2, 2020

(54) STABLE TRAINING REGION WITH ONLINE INVARIANT LEARNING

(71) Applicant: NEC Laboratories America, Inc., Princeton, NJ (US)

(72) Inventors: Tan Yan, Skillman, NJ (US); Haifeng Chen, West Windsor, NJ (US); LuAn Tang, Pennington, NJ (US)

(73) Assignee: NEC Corporation (JP)

( * ) Notice: Subject to any disclaimer, the term of this patent is extended or adjusted under 35 U.S.C. 154(b) by 42 days.

(21) Appl. No.: 16/009,822

(22) Filed: Jun. 15, 2018

(65) Prior Publication Data

US 2018/0364655 A1 Dec. 20, 2018

Related U.S. Application Data

(60) Provisional application No. 62/520,636, filed on Jun. 16, 2017.

(51) Int. Cl.
*G05B 13/02* (2006.01)
*B01D 53/30* (2006.01)
*G05B 13/04* (2006.01)

(52) U.S. Cl.
CPC ......... *G05B 13/0265* (2013.01); *B01D 53/30* (2013.01); *G05B 13/04* (2013.01); *B01D 2258/06* (2013.01)

(58) Field of Classification Search
None
See application file for complete search history.

(56) References Cited

U.S. PATENT DOCUMENTS

| 8,185,781 B2 | 5/2012 | Chen et al. | |
| 2013/0178987 A1* | 7/2013 | Meirav | F24F 11/0001 700/276 |
| 2014/0108324 A1* | 4/2014 | Chen | G06F 17/18 706/52 |
| 2016/0154802 A1* | 6/2016 | Yan | G05B 19/4184 707/725 |
| 2017/0284896 A1* | 10/2017 | Harpale | G01M 15/14 |

OTHER PUBLICATIONS

Chen, "Invariants Based Failure Diagnosis in Distributed Computing Systems", Proceedings of the 2010 IEEE Symposium on Reliable Distributed Systems, Nov. 2010, pp. 160-166.

Ou, "Real Time Hybrid Simulation with Online Model Updating", An Analysis of Accuracy, Mechanical Systems and Signal Processing, vol. 84 Part B, Jun. 2016, pp. 223-240.

* cited by examiner

*Primary Examiner* — Sean Shechtman
(74) *Attorney, Agent, or Firm* — Joseph Kolodka

(57) ABSTRACT

A computer-implemented method, system, and computer program product are provided for anomaly detection. The method includes receiving, by a processor, sensor data from a plurality of sensors in a system. The method also includes generating, by the processor, a relationship model based on the sensor data. The method additionally includes updating, by the processor, the relationship model with new sensor data. The method further includes identifying, by the processor, an anomaly based on a fused single-variant time series fitness score in the relationship model. The method also includes controlling an operation of a processor-based machine to change a state of the processor-based machine, responsive to the anomaly.

20 Claims, 9 Drawing Sheets

800

Receive sensor data from a plurality of sensors in a system, the sensor data including a plurality of pairs of two time series.
810

Generate a relationship model based on the plurality of pairs of two time series.
820

Update the relationship model with new sensor data.
830

Identify an anomaly based on a fused single-variant time series fitness score in the relationship model.
840

Control an operation of a processor-based machine to change a state of the processor-based machine, responsive to the anomaly.
850

FIG. 8

STABLE TRAINING REGION WITH ONLINE INVARIANT LEARNING

RELATED APPLICATION INFORMATION

This application claims priority to 62/520,636, filed on Jun. 16, 2017, incorporated herein by reference herein its entirety.

BACKGROUND

Technical Field

The present invention relates to invariant learning and more particularly finding stable training regions with online invariant learning.

Description of the Related Art

Complex physical systems consist of thousands of components, each having relationships with others. Such a system usually is mission critical, and failure from some components may lead to a whole system failure. Therefore, sensors are put in complex physical systems to monitor different components in a very fine granularity. The readings from the sensors are time series. It is critical to build effective tools to understand such complex relationships inside the system. However, due to the complexity of the system and the nature of the workload shifting, the output time series may be very noisy and may contain contradicting information, which affects the effectiveness of analysis results.

SUMMARY

According to an aspect of the present principles, a computer-implemented anomaly detection method is provided. The method includes receiving, by a processor, sensor data from a plurality of sensors in a system, the sensor data including a plurality of pairs of two time series. The method also includes generating, by the processor, a relationship model based on the plurality of pairs of two time series. The method additionally includes updating, by the processor, the relationship model with new sensor data. The method further includes identifying, by the processor, an anomaly based on a fused single-variant time series fitness score in the relationship model. The method also includes controlling an operation of a processor-based machine to change a state of the processor-based machine, responsive to the anomaly.

According to another aspect of the present principles, a computer program product is provided for anomaly detection. The computer program product comprising a non-transitory computer readable storage medium having program instructions. The program instructions executable by a computer to cause the computer to perform a method. The method includes receiving, by a processor, sensor data from a plurality of sensors in a system, the sensor data including a plurality of pairs of two time series. The method also includes generating, by the processor, a relationship model based on the plurality of pairs of two time series. The method additionally includes updating, by the processor, the relationship model with new sensor data. The method further includes identifying, by the processor, an anomaly based on a fused single-variant time series fitness score in the relationship model. The method also includes controlling an operation of a processor-based machine to change a state of the processor-based machine, responsive to the anomaly.

According to another aspect of the present principles, an anomaly detection system is provided. The anomaly detection system includes a processing system having a processor and memory coupled to the processor. The processing system programmed to receive sensor data from a plurality of sensors in a system, the sensor data including a plurality of pairs of two time series. The processing system is also programmed to generate a relationship model based on the plurality of pairs of two time series. The processing system is additionally programmed to update the relationship model with new sensor data. The processing system is further programmed to identify an anomaly based on a fused single-variant time series fitness score in the relationship model. The processing system is also programmed to control an operation of a processor-based machine to change a state of the processor-based machine, responsive to the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 is a block diagram illustrating a method for anomaly detection, in accordance with an embodiment of the present invention.

DETAILED DESCRIPTION OF PREFERRED EMBODIMENTS

Figure 1:
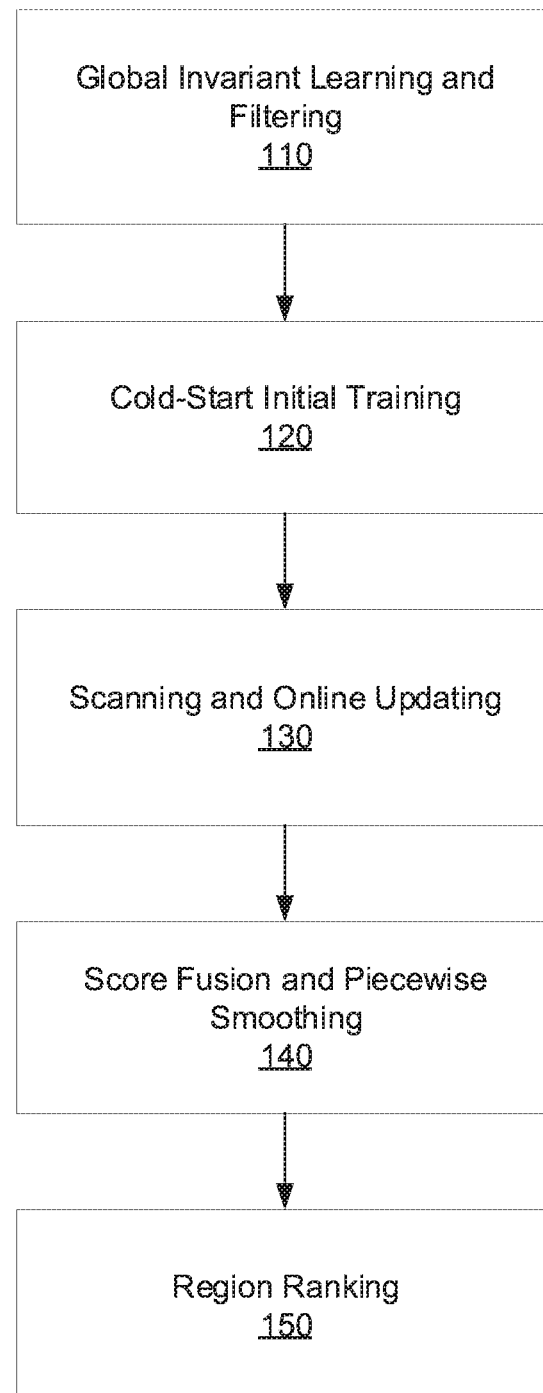
FIG. 1 is a block/flow diagram illustrating a high-level method for a region search engine, in accordance with an embodiment of the present invention.

Aspects of the present invention develop a region search engine, which first scans the entire region of a time series and incrementally builds models in a streaming fashion. Then the region search engine checks the quality of such models and tracks them along time to find the robust time regions that are suitable for further analysis.

In the modeling portion, for each pair of two time series, a linear regression function is estimated to represent the relationship between the two time series. For example, one of the time series is fit by using a linear function of another time series. This is done in an incremental streaming fashion. For example, a time window length is selected, and for each pair of time series, the linear regression is modeled within the time window and obtains a base function. In this way, a linear relationship is learned between each pair of time series based on the data within the first window size, and obtain a fitness score representing the goodness of fitting.

After the initial modeling, the window visits one point each time, which includes one new data point and excludes the oldest data point. In this way, the data inside the window is updated but still keeps the total amount of points in the window. After each visit, the relationship between each pair is estimated by updating from the linear regression learnt from previous windows. An efficient updating mechanism is developed based on Rank-one Update. For each pair of time series, the window is slid and the current relationship is updated upon each sliding until the window reaches the end of the time series. After each updating, an updated fitness score is obtained for this pair at the current time point. This generates a time series of fitness score, where each point represents the goodness of fit at the current time point for this pair of input time series.

All of the pairs of time series are updated, and a time series of fitness score is obtained for each pair of time series. Then, those multi-variant time series scores are aggregated and a fused single-variant time series is generated, which represent a fusion of estimation of the global goodness of fit for the whole system along time.

In the fused time series of fitness scores, a higher score indicates the system has more and higher relationships at a current time. A region including continuous high scores indicates the system is stable in this region and thus is satisfactory for being employed as training data.

The method will produce high quality results to select stable time regions to be used for training and establishing foundation for having reliable machine learning results. First, accurately selecting a good training region will increase the accuracy of further analysis results. For example, the method will directly benefit anomaly detection. Second, since the method ensures the cleanness of the data, the method helps the diagnosis of the analysis results. Third, since the method selects sub-regions out of the whole time series, the method reduces the amount of training data and improves the efficiency for getting robust results.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level method 100 for a region search engine is illustratively depicted in accordance with one embodiment of the present principles. When the engine gets the input data, the engine preprocesses and cleans up the data. After that, for each pair of two time series, a System Invariant Analysis Technology (SIAT) engine learns a global relationship and obtains a fitness score. This is done for all the pairs and only the pairs with high fitness scores are kept considering they have a higher likelihood to contain "good regions."

In block 110, global invariant learning and filtering keeps only good invariants. In block 120, cold-start initial training can have an initial model as a starting point. In block 130, scanning and online updating can have a sliding window to update the model along time. In block 140, score fusion and piecewise smoothing can have a fused fitness score over time, with a high score over a long region highlighting good regions. In block 150, region ranking occurs based on region stability, with stable regions being ranked higher.

Figure 2:
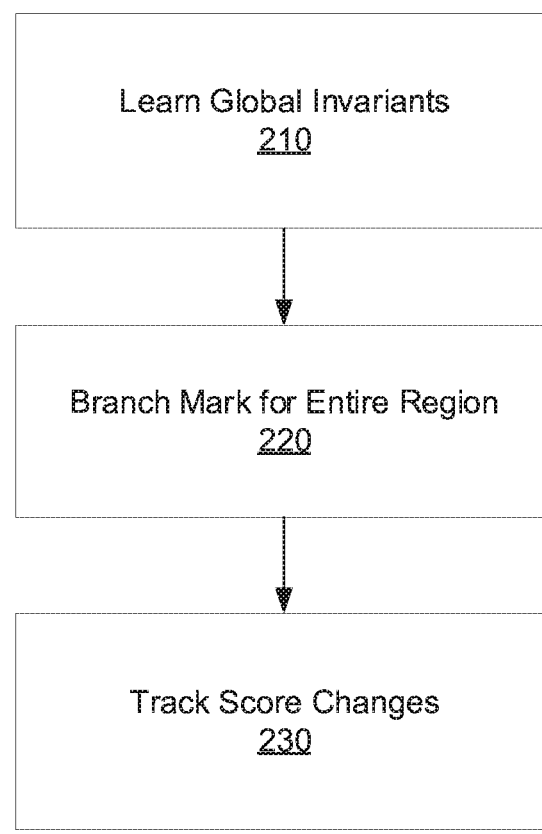
FIG. 2 is a block/flow diagram illustrating a system/method for invariant learning, in accordance with an embodiment of the present invention.

Referring now to FIG. 2, a system/method 200 for invariant learning is illustratively depicted in accordance with an embodiment of the present principles. In block 210, learn global invariants has an invariant pool that learns global invariants and keeps only ones with a value greater than a threshold value, e.g., 0.3. In block 220, branch mark for entire region has the invariant pool with a branch mark for the entire region. In block 230, track score changes compare a benchmark and only tracks the score change for invariants in the invariant pool.

Figure 3:
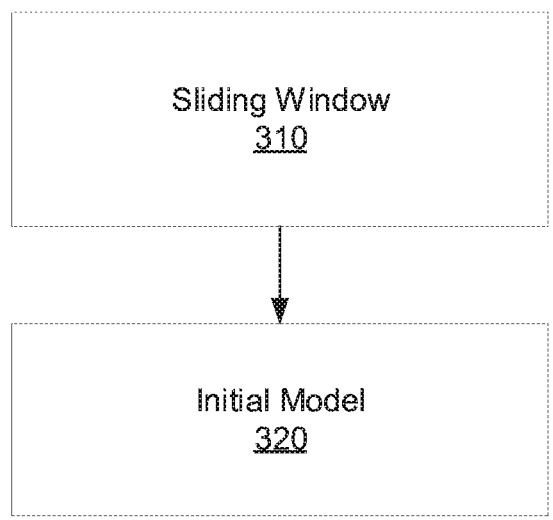
FIG. 3 is a block/flow diagram illustrating a system/method for cold-start initial fitting, in accordance with an embodiment of the present invention.

Referring now to FIG. 3, a system/method 300 for cold-start initial fitting is illustratively depicted in accordance with an embodiment of the present principles. For that selected pairs, a cold-start initial fitting is performed that chooses a time window at the beginning of the time series, and learns a linear relationship. In block 310, a sliding window trains using data over time, e.g., from 0~T, to get an initial model using only ones in the invariant pool. In block 320, initial model at T is the only model learned from scratch with later models being updated from the initial model. The initial model generates pairwise fitness scores and fused fitness scores in later updated models.

Figure 4:
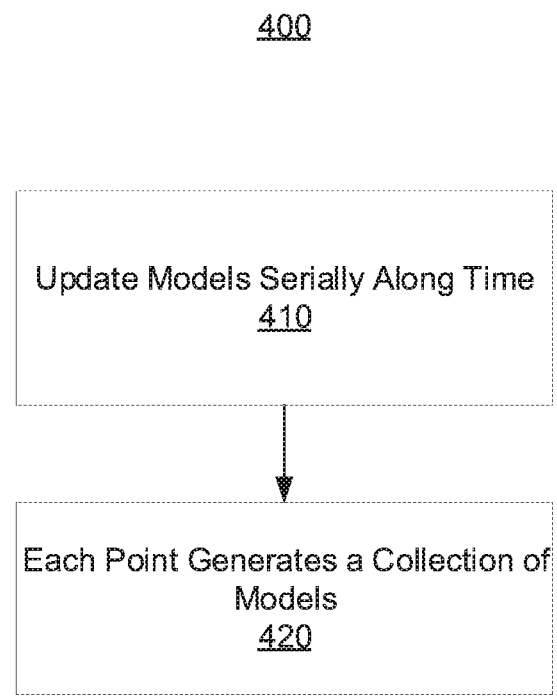
FIG. 4 is a block/flow diagram illustrating a system/method for model updating, in accordance with an embodiment of the present invention.

Referring now to FIG. 4, a system/method 400 for model updating is illustratively depicted in accordance with an embodiment of the present principles. The model update includes the scanning process for each pair of time series. In block 410, the models are updated serially along time, $M_T$. In block 420, each point generates a collection of models, a collection of fitness scores, and a fused fitness score representing the point.

In one embodiment, the rank-one can be updated:
Invariant model: $y(t)=\varphi(t)^T \theta$, with $y(t)$ being the value of output time series at time t, $\varphi(t)^T$ being the value of input time series at time t, since there are multiple input time series, this value is a vector, and $\theta$ being the invariant parameter that represents the relationship between input and output time series that is learned by the system.
Least square estimation of first sliding window with [1, N]:

$$\theta_{1\sim N} = \left[\sum_{t=1}^{N} \varphi(t)\varphi(t)^T\right]^{-1} \sum_{t=1}^{N} \varphi(t)y(t) = A_{1\sim N}^{-1} \cdot B_{1\sim N}$$

here, $A=[\Sigma_{t=1}^{N}\varphi(t)\varphi(t)^T]$ and $B=\Sigma_{t=1}^{N}\varphi(t)y(t)$, then sliding window from [2, N+1], with the matrix reverse for every pair and every window $A_{2\sim N+1}^{-1}$:

$$\theta_{2\sim N+1} = \left[\sum_{t=2}^{N+1} \varphi(t)\varphi(t)^T\right]^{-1} \sum_{t=2}^{N+1} \varphi(t)y(t) =$$

$$A_{2\sim N+1}^{-1} \cdot B_{2\sim N+1} = \left[\left(\sum_{t=1}^{N} \varphi(t)\varphi(t)^T\right) - \varphi(1)\varphi(1)^T + \varphi(N+1)\varphi(N+1)^T\right]^{-1}$$

$$\left(\left(\sum_{t=1}^{N} \varphi(t)y(t)\right) - \varphi(1)y(1) + \varphi(N+1)y(N+1)\right) =$$

$$[A_{1\sim N} - \varphi(1)\varphi(1)^T + \varphi(N+1)\varphi(N+1)^T]^{-1}$$

$$(B_{1\sim N} - \varphi(1)y(1) + \varphi(N+1)y(N+1)),$$

leveraging the previously calculated $A_{1\sim N}$ and $B_{1\sim N}$. The rank-one matrix being $\varphi(1)\varphi(1)^T$ and $\varphi(N+1)\varphi(N+1)^T$.
In another embodiment, the rank-one can be updated employing a Sherman-Morrison formula:

$$(A + uv^T)^{-1} = A^{-1} - \frac{A^{-1}uv^T A^{-1}}{1 + v^T A^{-1} u}$$

with Rank(u)=Rank(v)=1. A is the rank one matrix and u, v are two column vectors. A Sherman-Morrison formula is employed to update the invertible matrix in a new time window. Suppose $A_{1\sim N}^{-1}$ is already computed in a time window 1 to N, then after time window N+1, $A_{1\sim N+1}^{-1}$ can be computed using the above.

Figure 5:
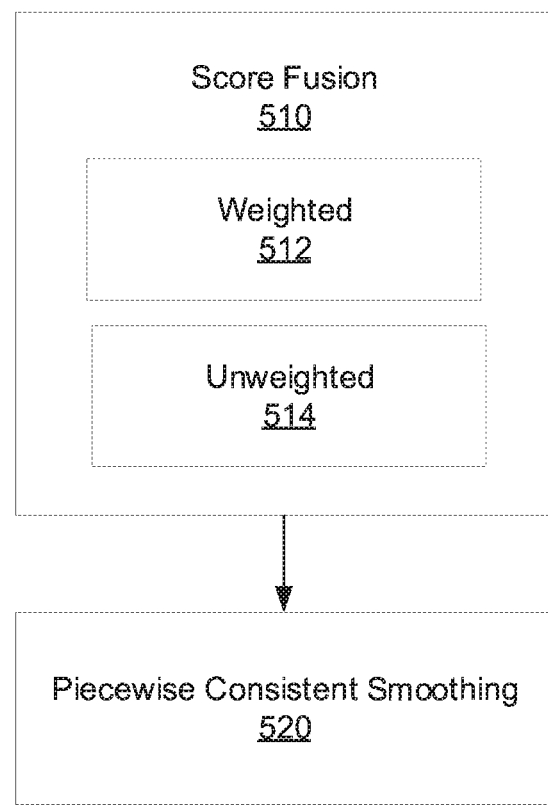
FIG. 5 is a block/flow diagram illustrating a system/method for score fusion and piecewise smoothing, in accordance with an embodiment of the present invention.

Referring now to FIG. 5, a system/method 500 for score fusion and piecewise smoothing is illustratively depicted in accordance with an embodiment of the present principles. Piece-wise smoothing is employed to remove the noise of learnt fitness scores and ensure the region continuity. In Block 510, score fusion to combine fitness scores. Block 510 can include Block 512 and Block 514. In Block 512, weighted fusion separated the invariants regions and jointly considers both the number of invariants and the scores of the invariants in both regions. In one embodiment, the regions can be [0~0.5] and [0.5~1]. In Block 520, piecewise consistent smoothing employs a 1D Fused Lasso to smooth with a penalty for differences between two consecutive scores.

Remove the noise from score time series while still capturing the consistent good region along time by fitting the original time series with constraint of piecewise constant between each consecutive two points employing the following optimization problem:

$$\hat{\beta} = \arg\min_{\beta \in \mathbb{R}^n} \frac{1}{2} \sum_{i=1}^{n} (y_i - x_i\beta_i)^2 + \lambda \sum_{i=1}^{n-1} |\beta_{i+1} - \beta_i|$$

with $$\frac{1}{2} \sum_{i=1}^{n} (y_i - \beta_i)^2$$

minimizing the fitting error and $\lambda\Sigma_{i=1}^{n-1}|\beta_{i+1}-\beta_i|$ minimizing the difference between each consecutive two points. $y_i$ is the value of output time series at time i, $x_i$ is the value of input time series, it is a vector since there are multiple input time series. $\beta_i$ is the invariant parameter that reflects the relationship between $x_i$ and $y_i$ estimated by the system.

The optimization problem can be the equivalent to solving the following minimization problem, to be considered 1D Fussed Lasso:

$$\hat{\beta} \in \arg\min_{\beta \in \mathbb{R}^p} \frac{1}{2}\|y - X\beta\|_2^2 + \lambda\|D\beta\|_1$$

with the matrix D:

$$D = \begin{bmatrix} -1 & 1 & 0 & \ldots & 0 & 0 \\ 0 & -1 & 1 & \ldots & 0 & 0 \\ \vdots & \vdots & \vdots & \ldots & \vdots & \vdots \\ 0 & 0 & 0 & \ldots & -1 & 1 \end{bmatrix}.$$

y is the output time series, X is the matrix of input time series, and $\beta$ is the invariant parameter.

Figure 6:
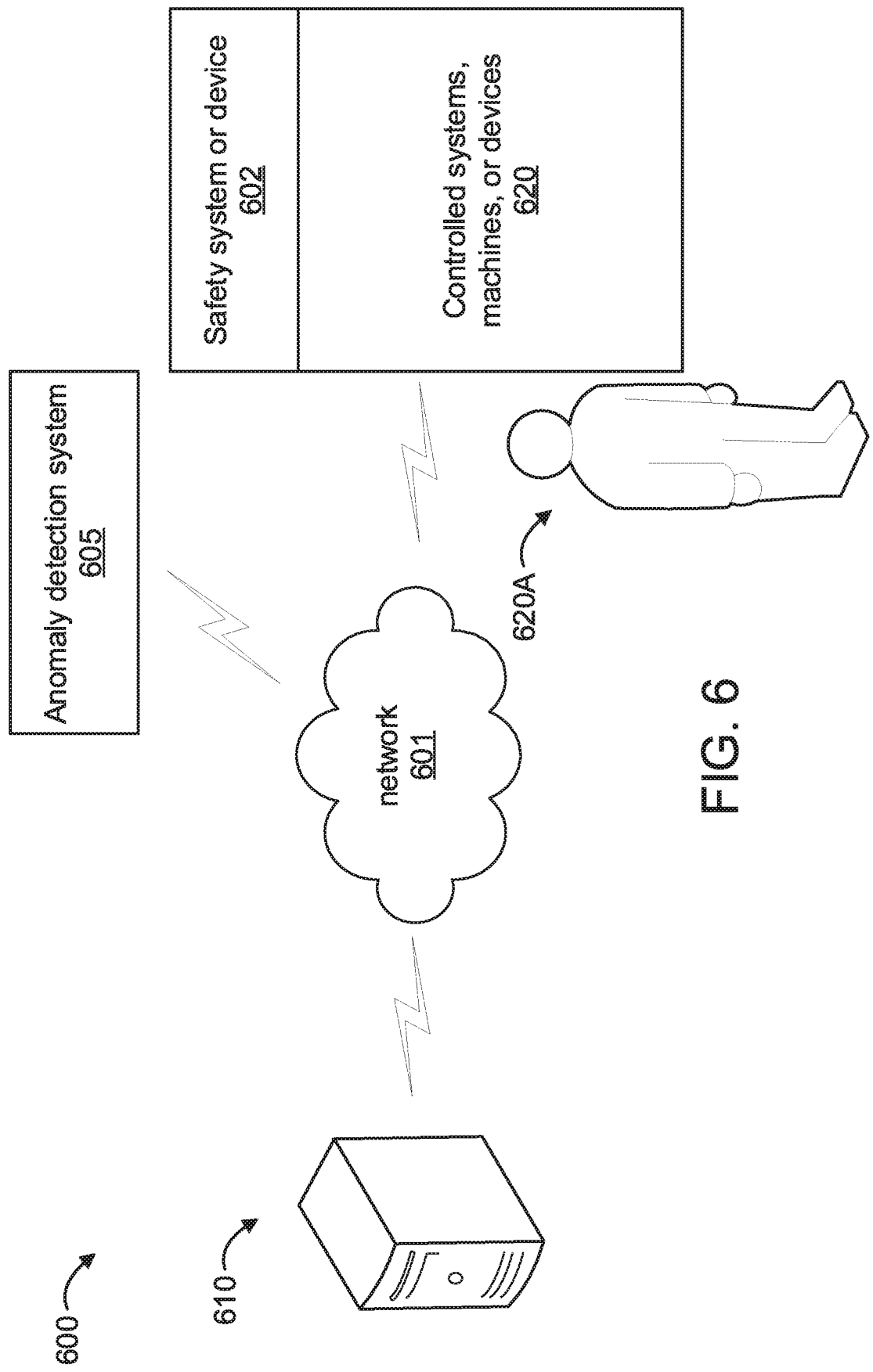
FIG. 6 shows a block diagram of an exemplary environment to which the present invention can be applied, in accordance with an embodiment of the present invention.

FIG. 6 shows a block diagram of an exemplary environment 600 to which the present invention can be applied, in accordance with an embodiment of the present invention. The environment 600 is representative of a computer network to which aspects of the present invention can be applied. The elements shown relative to FIG. 6 are set forth for the sake of illustration. However, it is to be appreciated that aspects of the present invention can be applied to other network configurations and other operational environments as readily contemplated by one of ordinary skill in the art given the teachings of the present invention provided herein, while maintaining aspects of the present invention.

The environment 600 at least includes at least one safety system or device 602, at least one fault detection system 605, at least one computer processing system 610, at least one controlled system(s), machine(s), and/or device(s) (individually and collectively denoted by the reference numeral 620 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining aspects of the of the present invention. The computer processing system 610 can be any type of computer processing system including, but not limited to, servers, desktops, laptops, tablets, smart phones, media playback devices, and so forth, depending upon the particular implementation. For the sake of illustration, the computer processing system 610 is a server.

The at least one anomaly detection system 605 is configured to detect one or more anomalies. In one embodiment, the at least one anomaly detection system employs a region search engine. The computer processing system 610 is configured to perform anomaly detection utilizing the at least one anomaly detection system. Moreover, the computer processing system 610 is configured to initiate an action (e.g., a control action) on the controlled system, machine, and/or device 620 responsive to the detected anomaly. Such action can include, but is not limited to, one or more of: powering down the controlled system, machine, and/or device 620 or a portion thereof; powering down, e.g., a system, machine, and/or a device that is affected by an anomaly in another device, stopping a centrifuge being operated by a user 620A before an imbalance in the centrifuge causes a critical failure and harm to the user 620A, opening a valve to relieve excessive pressure (depending upon the anomaly), locking an automatic fire door, ventilating a room when an anomaly is detected by an gas sensor, enabling an air scrubber in a laboratory when an anomaly is detected monitoring an experiment, routing a communication network around a node with that has a detected anomaly, routing a power grid around a transformer that has a detected anomaly, and so forth. As is evident to one of ordinary skill in the art, the action taken is dependent upon the type of anomaly and the controlled system, machine, and/or device 620 to which the action is applied.

The safety system or device 602 can implement the aforementioned or other action. The safety system or device 602 can be a shut off switch, a fire suppression system, an overpressure valve, and so forth. As is readily appreciated by one of ordinary skill in the art, the particular safety system or device 602 used depends upon the particular implementation to which the present invention is applied. Hence, the safety system 602 can be located within or proximate to or remote from the controlled system, machine, and/or device 620, depending upon the particular implementation.

In the embodiment shown in FIG. 6, the elements thereof are interconnected by a network(s) 601. However, in other embodiments, other types of connections (e.g., wired, etc.) can also be used. Additionally, one or more elements in FIG. 6 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 700 are readily determined by one of ordinary skill in the art, given the teachings of the present invention provided herein, while maintaining aspects of the of the present invention.

Figure 7:
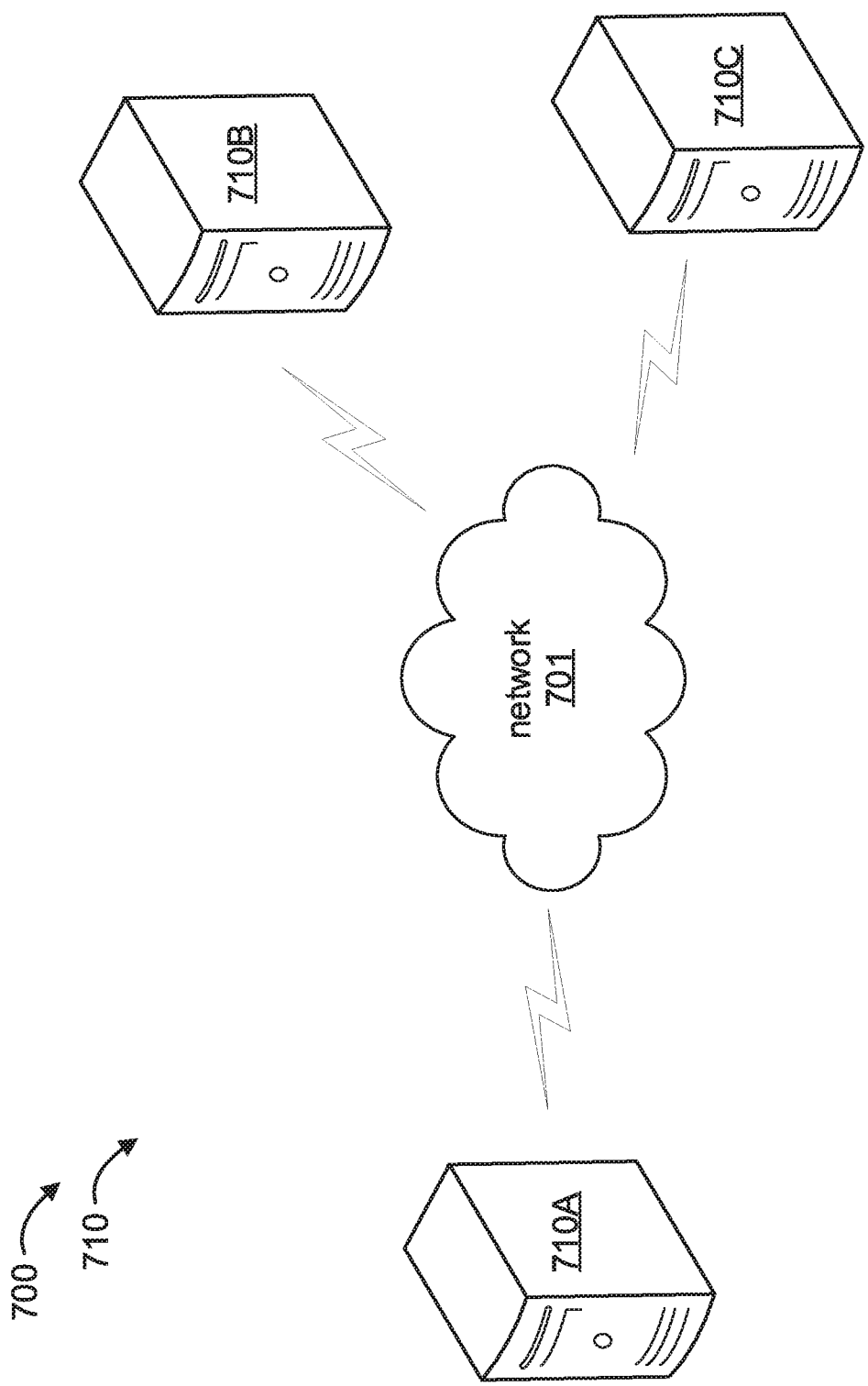
FIG. 7 shows a block diagram of an exemplary environment to which the present invention can be applied, in accordance with an embodiment of the present invention.

FIG. 7 shows an exemplary environment 700 to which aspects of the present invention can be applied, in accordance with an embodiment of the present invention. The environment 700 is representative of a computer network to which aspects of the present invention can be applied. The elements shown relative to FIG. 7 are set forth for the sake of illustration. However, it is to be appreciated that the present invention can be applied to other network configurations as readily contemplated by one of ordinary skill in the art given the teachings of the present invention provided herein, while maintaining aspects of the of the present invention.

The environment 700 includes a set of computer processing systems 710. The computer processing systems 710 can be any type of computer processing system including, but not limited to, servers, desktops, laptops, tablets, smart phones, media playback devices, and so forth. For the sake of illustration, the computer processing systems 710 include server 710A, server 710B, and server 710C.

In an embodiment, aspects of the present invention perform system fault diagnosis via a region search engine on the computer processing systems 710. Thus, any of the computer processing systems 710 can perform system fault diagnosis via a region search engine that produces a fault event on, or is accessed by, any other of the computer processing systems 710. Moreover, the output (including corrective actions) of aspects of the present invention can be used to control other systems and/or devices and/or operations and/or so forth, as readily appreciated by one of ordinary skill in the art given the teachings of the present invention provided herein, while maintaining aspects of the of the present invention.

In the embodiment shown in FIG. 7, the elements thereof are interconnected by a network(s) 701. However, in other embodiments, other types of connections can also be employed. Additionally, one or more elements in FIG. 7 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 700 can be employed.

Referring now to FIG. 8, a block diagram illustrating a method for anomaly detection, in accordance with an embodiment of the present invention. In block 810, receive sensor data from a plurality of sensors in a system, the sensor data including a plurality of pairs of two time series. In block 820, generate a relationship model based on the plurality of pairs of two time series. In block 830, update the relationship model with new sensor data. In block 840, identify an anomaly based on a fused single-variant time series fitness score in the relationship model. In block 850, control an operation of a processor-based machine to change a state of the processor-based machine, responsive to the anomaly.

Figure 9:
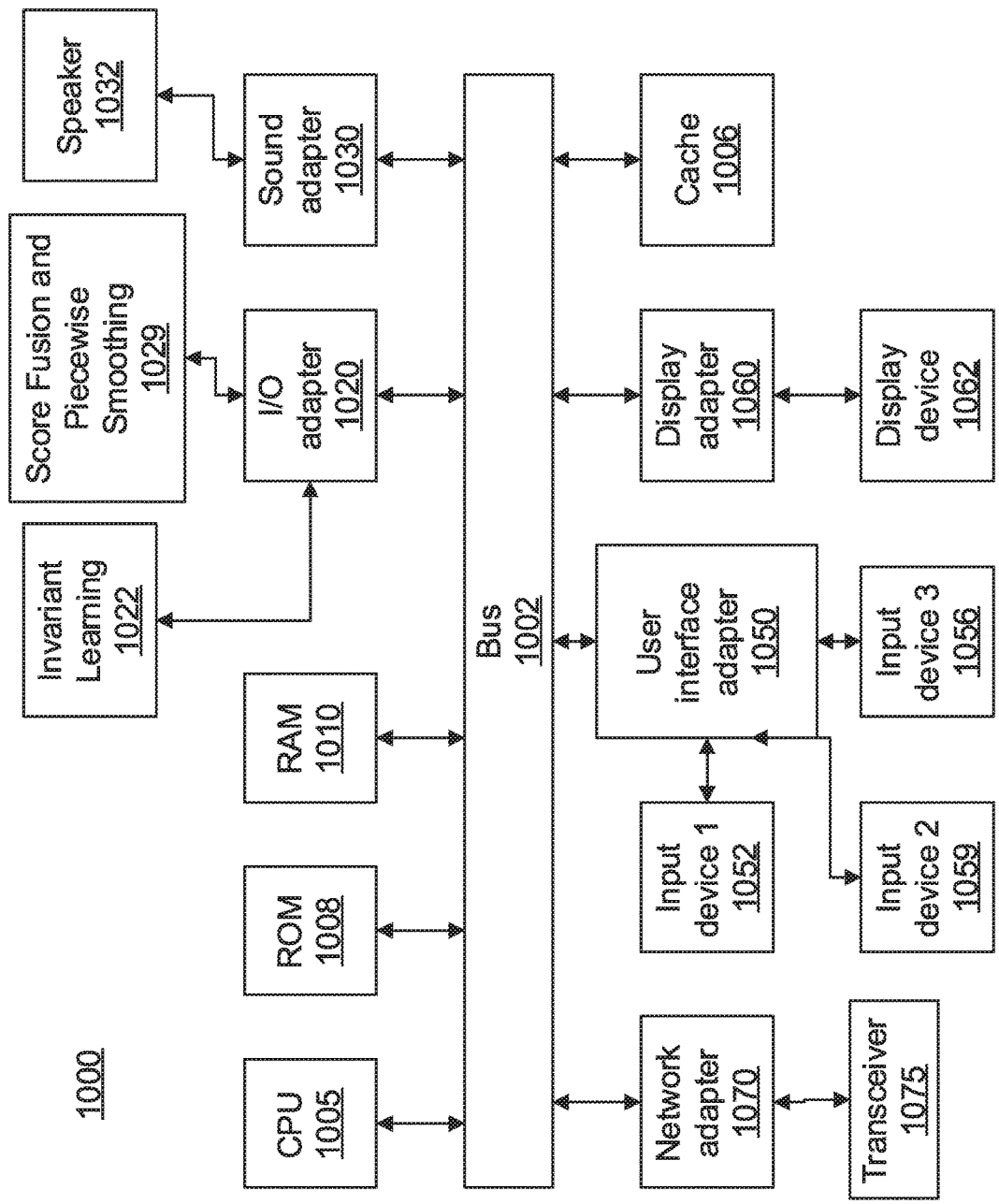
FIG. 9 shows a block diagram of a computer processing system, to be used to reconfigure the ROSS or for control purposes, in accordance with an embodiment of the present invention.

Referring now to FIG. 9, a block diagram of a computer processing system 1000, to find failing components in a complex physical system, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

An invariant learning device 1022 and a score fusion and piecewise smoothing device 1029 are operatively coupled to system bus 1002 by the I/O adapter 1020. The devices 1022 and 1029 can be employed to learn invariants from a data set over time and fuse the scores of the invariants and smooth the scores employing a 1D fused lasso.

A speaker 1032 may be operatively coupled to system bus 1002 by the sound adapter 1030. The speaker 1032 can sound an alarm when controlled. A transceiver 1075 is operatively coupled to system bus 1002 by network adapter 1070. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in the present invention. The user input devices 1052, 1059, and 1056 can be the same type of user input device or different types of user input devices. The user input devices 1052, 1059, and 1056 are used to input and output information to and from system 1000.

Of course, the computer system 1000 may also include other elements (not shown), as readily contemplated by one of skill in the art, as well as omit certain elements. For example, the systems described in FIGS. 2, 3, 4, and 5 can be controlled by computer system 1000. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, it is to be appreciated that network 600 and network 700 described above with respect to FIG. 6 and FIG. 7 are networks for implementing respective embodiments of the present invention. Part or all of computer processing system 1000 may be implemented in one or more of the elements of network 600 and/or one or more of the elements of network 700.

Further, it is to be appreciated that computer processing system 1000 may perform at least part of the method described herein including, for example, at least part of method 100 of FIG. 1 and/or method 800 of FIG. 8.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for anomaly detection, the method comprising:
    receiving, by a processor, sensor data from a plurality of sensors in a system, the sensor data including a plurality of pairs of two time series;
    generating, by the processor, a relationship model based on the plurality of pairs of two time series;
    removing noise from the plurality of pairs of time series while capturing a consistent good region along time by optimizing by fitting an original time series with a constraint of piecewise constant between each consecutive two points $$\hat{\beta} = \arg\min_{\beta \in \mathbb{R}^n} \frac{1}{2} \sum_{i=1}^{n} (y_i - x_i \beta_i)^2 + \lambda \sum_{i=1}^{n-1} |\beta_{i+1} - \beta_i|$$

wherein $$\frac{1}{2} \sum_{i=1}^{n} (y_i - \beta_i)^2$$

minimizes the fitting error, $\lambda \Sigma_{i=1}^{n-1} |\beta_{i+1} - \beta_i|$ minimizes the difference between the each consecutive two points, $y_i$ is a value of an output time series at time i, $x_i$ is a value of an input time series, and $\beta_i$ is an invariant parameter reflecting a relationship between $x_i$ and $y_i$ determined by the processing system;
    updating, by the processor, the relationship model with new sensor data;
    identifying, by the processor, an anomaly based on a fused single-variant time series fitness score in the relationship model; and
    controlling an operation of a processor-based machine to change a state of the processor-based machine, responsive to the anomaly.

2. The computer-implemented method as recited in claim 1, wherein generating includes estimating a linear regression function to represent the relationship between each of the plurality of pairs of two time series.

3. The computer-implemented method as recited in claim 1, wherein controlling includes turning on an air scrubber in a laboratory environment.

4. The computer-implemented method as recited in claim 1, wherein generating includes incrementally fitting one time series in the sensor data by using a linear function of another time series in the sensor data.

5. The computer-implemented method as recited in claim 1, wherein controlling includes activating security measures.

6. The computer-implemented method as recited in claim 1, wherein generating includes selecting a time window and obtaining a base function, the base function employing a linear regression within the time window for each of the plurality of pairs of two time series.

7. The computer-implemented method as recited in claim 6, wherein the base function includes a linear relationship between each of the plurality of pairs of two time series responsive to data within the time window.

8. The computer-implemented method as recited in claim 1, wherein updating includes sliding a time window one point each time, which includes one new data point and excludes an oldest data point, to maintain a number of data points in the time window.

9. The computer-implemented method as recited in claim 1, wherein updating includes estimating a relationship between each of the plurality of pairs of two time series by updating a linear regression learnt from a previous time window.

10. The computer-implemented method as recited in claim 1, wherein updating includes obtaining a fitness score for each of the plurality of pairs of two time series at a current time point to generate a time series of fitness scores for each of the plurality of pairs of two time series.

11. The computer-implemented method as recited in claim 10, further comprises aggregating the time series of fitness scores for each of the plurality of pairs of two time series to generate the fused single-variant time series fitness score.

12. A computer program product for anomaly detection, the computer program product comprising a non-transitory computer readable storage medium having program instructions embodied therewith, the program instructions executable by a computer to cause the computer to perform a method comprising:

receiving, by a processor, sensor data from a plurality of sensors in a system, the sensor data including a plurality of pairs of two time series;
generating, by the processor, a relationship model based on the plurality of pairs of two time series;
removing noise from the plurality of pairs of time series while capturing a consistent good region along time by optimizing by fitting an original time series with a constraint of piecewise constant between each consecutive two points as follows:

$$\hat{\beta} = \arg\min_{\beta \in \mathbb{R}^n} \frac{1}{2} \sum_{i=1}^{n} (y_i - x_i \beta_i)^2 + \lambda \sum_{i=1}^{n-1} |\beta_{i+1} - \beta_i|$$

wherein $$\frac{1}{2} \sum_{i=1}^{n} (y_i - \beta_i)^2$$

minimizes the fitting error, $\lambda \Sigma_{i=1}^{n-1} |\beta_{i+1} - \beta_i|$ minimizes the difference between the each consecutive two points, $y_i$ is a value of an output time series at time i, $x_i$ is a value of an input time series, and $\beta_i$ is an invariant parameter reflecting a relationship between $x_i$ and $y_i$ determined by the processing system;
updating, by the processor, the relationship model with new sensor data;
identifying, by the processor, an anomaly based on a fused single-variant time series fitness score in the relationship model; and
controlling an operation of a processor-based machine to change a state of the processor-based machine, responsive to the anomaly.

13. An anomaly detection system, the anomaly detection system comprising:

a processing system including a processor and memory coupled to the processor, the processing system programmed to:

receive sensor data from a plurality of sensors in a system, the sensor data including a plurality of pairs of two time series;
generate a relationship model based on the plurality of pairs of two time series;
remove noise from the plurality of pairs of time series while capturing a consistent good region along time by optimizing by fitting an original time series with a constraint of piecewise constant between each consecutive two points as follows:

$$\hat{\beta} = \arg\min_{\beta \in \mathbb{R}^n} \frac{1}{2} \sum_{i=1}^{n} (y_i - x_i \beta_i)^2 + \lambda \sum_{i=1}^{n-1} |\beta_{i+1} - \beta_i|$$

wherein $$\frac{1}{2} \sum_{i=1}^{n} (y_i - \beta_i)^2$$

minimizes the fitting error, $\lambda \Sigma_{i=1}^{n-1} |\beta_{i+1} - \beta_i|$ minimizes the difference between the each consecutive two points, $y_i$ is a value of an output time series at time i, $x_i$ is a value of an input time series, and $\beta_i$ is an invariant parameter reflecting a relationship between $x_i$ and $y_i$ determined by the processing system;
update the relationship model with new sensor data;
identify an anomaly based on a fused single-variant time series fitness score in the relationship model; and
control an operation of a processor-based machine to change a state of the processor-based machine, responsive to the anomaly.

14. The anomaly detection system as recited in claim 13, wherein the processing system is further programmed to estimate a linear regression function to represent the relationship between each of the plurality of pairs of two time series.

15. The anomaly detection system as recited in claim 13, wherein the processing system is further programmed to turn on an air scrubber in a laboratory environment.

16. The anomaly detection system as recited in claim 13, wherein the processing system is further programmed to incrementally fit one time series in the sensor data by using a linear function of another time series in the sensor data.

17. The anomaly detection system as recited in claim 13, wherein the processing system is further programmed to activate security measures.

18. The anomaly detection system as recited in claim 13, wherein the processing system is further programmed to choose a time window and obtains a base function, the base function employing a linear regression within the time window for each of the plurality of pairs of two time series.

19. The anomaly detection system as recited in claim 18, wherein the base function includes a linear relationship between each of the plurality of pairs of two time series responsive to data within the time window.

20. The anomaly detection system as recited in claim 13, wherein the processing system is further programmed to slide a time window one point each time, which includes one new data point and excludes an oldest data point, to maintain a number of data points in the time window.

* * * * *